Figure 1:
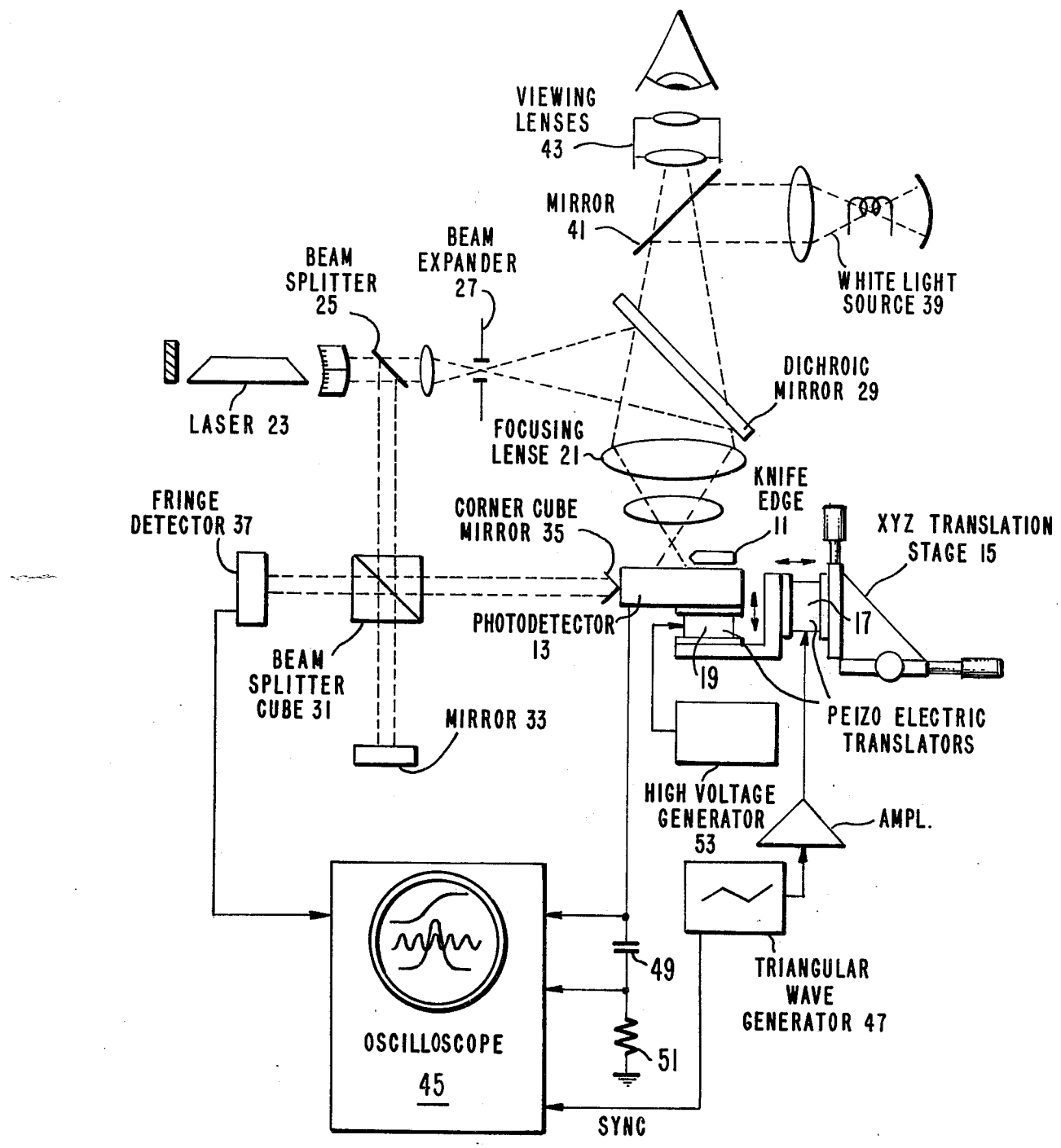

United States Patent [19]
Firester et al.

[11] 4,160,598
[45] Jul. 10, 1979

[54] APPARATUS FOR THE DETERMINATION OF FOCUSED SPOT SIZE AND STRUCTURE

[75] Inventors: Arthur H. Firester, Skillman; Macy E. Heller, Trenton, both of N.J.

[73] Assignee: RCA Corporation, New York, N.Y.

[21] Appl. No.: 827,254

[22] Filed: Aug. 24, 1977

[51] Int. Cl.² .............................................. G01J 1/00
[52] U.S. Cl. .................................. 356/121; 350/269
[58] Field of Search ................ 356/121; 350/266, 269, 350/271

[56] References Cited

U.S. PATENT DOCUMENTS

| 3,612,885 | 10/1971 | Arnaud ................................. 356/160 |
| 3,894,804 | 7/1975 | Detwiler et al. ....................... 356/121 |

FOREIGN PATENT DOCUMENTS 584404  1/1977  Switzerland ............................. 356/121

OTHER PUBLICATIONS

Gorog et al., "Information Scanning Technology: Applications of CW AlGaAs Injection Lasers;" *Applied Optics;* Jun. 1976, vol. 15, pp. 1425–1431.
Firester et al., "Knife-Edge Scanning Measurements of Subwavelength Focused Light Beams;" *Applied Optics,* Jul. 1977, vol. 16, pp. 1971–1974.

Primary Examiner—John K. Corbin
Assistant Examiner—R. A. Rosenberger
Attorney, Agent, or Firm—Eugene M. Whitacre; W. H. Meagher

[57] ABSTRACT

The light power not occluded during a repetitive, transverse knife-edge scanning of a focused spot is measured by a photodetector while an interferometer measures the displacement of the knife-edge during the scanning operation. The knife-edge is supported on a glass plate carried by the photodetector with a liquid medium being located between the glass plate and the light sensitive surface of the photodetector to enhance light reception by the photodetector. The differentiated output of the photodetector when displayed (e.g., by means of an oscilloscope) provides a graphic representation of the intensity profile of the spot which is dependent on the composite refractive index of the glass plate and the liquid medium. The output of the interferometer when displayed along with the intensity profile of the spot provides a known quantity with reference to which spot diameter as a function of the composite refractive index can be accurately determined to within ⅛ of a wavelength of the light provided for the measurements of the interferometer.

4 Claims, 3 Drawing Figures

APPARATUS FOR THE DETERMINATION OF FOCUSED SPOT SIZE AND STRUCTURE

The present invention relates, in general, to optical measurement systems, and more particularly, to systems for determining the size and structure of submicron focused spots.

In the prior art (e.g., an article of I. Gorog, et al., published June, 1976, in Volume 15 of *Applied Optics* at page 1427), knife-edge scanning methods have been proposed in which the measurement of the effective size of submicron spots is accomplished by means of knife-edge scanning. The focused light spot is repetitively intercepted with a knife-edge and the light power back scattered by the knife-edge and intercepted by the spot forming lens is detected. The detected light power is the spatial step function response of the back scattered beam and the derivative thereof, representative of the effective intensity profile of the spot displayed by means of an oscilloscope. By simultaneously displaying, along with the effective intensity profile of the spot, the output of an interferometer which measures the displacement of the knife-edge as it scans across the spot, the measurement of distances along the spot profile which are accurate to within an eighth of a wavelength of the interferometer's illumination light is readily enabled.

However, where the ability of a focusing system to form submicron focused spots is to be accurately determined, such as for high-density video information recording or playback applications, one must measure the maximum amount of light not occluded by the knife-edge. Additionally, account must be taken of the optical properties of the material on which the spot is to be formed (e.g., the light sensitive resist layer surface of a recording blank). For a description of high-density video information optical recording and playback systems reference may be made to copending U.S. application, Ser. No. 668,495, filed on Mar. 19, 1976—Spong, now U.S. Pat. No. 4,097,895. In accordance with the principles of the present invention, the accurate determination of submicron focused spot diameters within the light sensitive medium is advantageously realized by an apparatus where the optical properties of a surface on which the focused spot is to be formed is provided with optical properties which substantially correspond to the optical properties of the light sensitive surface of the high-density information record blank.

In accordance with one aspect of the present invention, the provision of such a surface which optically matches the application surface is realized by providing a photodetector having a light sensitive surface which is overlaid with a glass plate with a liquid medium being disposed between the light sensitive surface and the glass plate. By proper selection of liquid medium, the composite refractive index of the liquid medium and the glass plate can be made to correspond to the refractive index of the application surface.

Fresnel reflection of high incident light at the surface of the glass plate now desirably corresponds to the Fresnel reflection at the surface of the light sensitive surface of the recording blank. Accordingly, the light transmitted to the immersed photodetector is representative of the light entering the light sensitive layer of the recording blank.

In accordance with one aspect of the present invention, the sensitivity of the output of a photodetector, representative of the light power not occluded during the transition of the knife-edge scan across the focused spot, to the acceptance angle of the incident light, necessary for measurement of submicron focused spots, is reduced by positioning of the knife-edge directly over the light sensitive surface of the photodetector and simultaneously displacing both the detector and the knife-edge during the scanning of the spot. Incident light losses due for example to knife-edge diffraction and geometric aperturing are thereby decreased.

Pursuant to yet another aspect of the present invention, the quality of a beam focusing system which is related to the diameter of the narrowest beam waist which may be formed by such a system can be determined through the provision of a "real time" display of the intensity profile of a transverse section of a beam focused by such system along with means for sampling transverse sections of the beam along different axial positions of the focused beam. This "real time" display of the various sampled transverse sections readily enables a direct determination of the diameter of the narrowest beam waist which the focusing system is capable of producing.

In accordance with an illustrative embodiment of the present invention, a smooth knife-edge (formed of a 600Å thick chrominum layer evaporated on a glass plate and photolithographically etched to form an abrupt edge), is supported on a PIN photodiode which is provided with a liquid immersed light sensitive area large enough to cover the wide diffraction pattern from the knife-edge. A suitable immersion liquid, such as oil with a refractive index of 1.518, which, in combination with the glass plate provides a composite refraction index of 1.5 to closely match the refraction index of the resist film layer, is employed. The photodiode, in turn, is supported on an XYZ translation stage having both coarse and fine screw adjustments. Additionally, the translation stage is provided with piezoelectric translators capable of producing highly reliable motion in two of the orthogonal directions of motion of which the XYZ translator is capable of moving (hereinafter designated horizontal and vertical directions to simplify system description). The lens to be tested is positioned vertically above the photodetector such that when a beam of light is passed therethrough, it is focused on the knife-edge. Tracking of the knife-edge movements is accomplished by means of an interferometer which measures the displacement of the knife-edge.

Since the depth of field of a submicron spot is extremely shallow, the piezoelectric translator providing motion in the vertical direction is employed to achieve the fine motions needed for critical focusing and which cannot be accurately supplied by the screw adjustment of the XYZ stage. The piezoelectric translator providing motion in the horizontal direction, on the other hand, enables the establishment of relative motion between the focused beam and the knife-edge in a manner leading to repeated scannings of the spot by the knife-edge.

The output of the photodetector, representative of the light power not occluded during the repetitive knife-edge scanning of the light spot, is applied to an image display means (e.g., an oscilloscope) through a differentiating circuit. The output of the interferometer means is advantageously, simultaneously displayed on the same image display means to provide a known reference against which the displayed spot profile can be measured. Advantageously, the triangular waveform generator also provides a synchronizing pulse to the image display means, and only that portion of the knife-edge scan which contains the transition across the focused spot is displayed.

Figure 2:
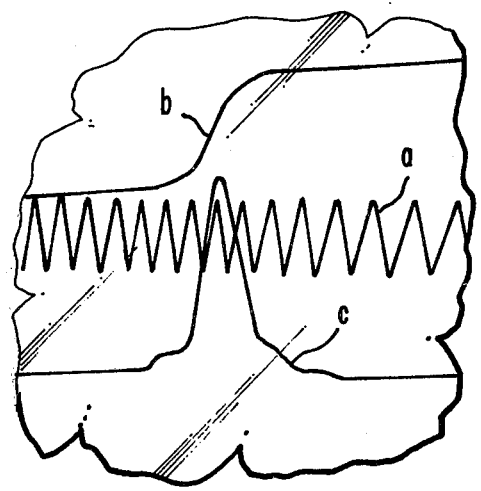
Figure 3:
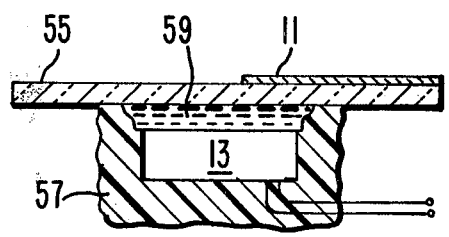

In the accompanying drawings:

FIG. 1 provides a representation of an apparatus for the measurement of light spot size and structure in accordance with one embodiment of the present invention;

FIG. 2 provides a graph of the relationship between various waveforms, including representation of a spot intensity profile and an interferometrically measured displacement of a knife-edge across the spot, generated by the apparatus of FIG. 1, and FIG. 3 illustrates an embodiment of a knife-edge integrally formed with a photodetector of the apparatus of FIG. 1 which enables measurement of submicron focused spots under projected use condition.

In FIG. 1, a representation of an apparatus for the display of the intensity profile of a focused light spot is shown pursuant to an illustrative embodiment of the present invention. A smooth knife-edge 11 is fixedly supported on a large area photodetector 13 (e.g., a PIN photodiode operated in a reverse bias mode). The photodetector 13 is, in turn, supported on an XYZ translation stage 15 having both linear and differential screw adjustments. Additionally, the translation stage 15 is provided with piezoelectric translators 17, 19 capable of producing highly reliable motion in the horizontal and vertical directions respectively. A lens 21 to be tested is positioned vertically above the photodetector 13 such that when a beam of light is passed therethrough, it is focused on the knife-edge's surface 11.

The monochromatic light output of a laser 23 (illustratively, of an argon type providing an output wavelength of 4579Å) is passed through a beam splitter 25. A beam expander 27 (illustratively formed by a low power microscope objective lens in series with a spatial filter) forms the light passed by beam splitter 25 into a beam which is reflected off a dichroic mirror 29 onto the entrance aperture of lens 21 to be focused on the surface of knife-edge 11.

The light intercepted by beam splitter 25 is reflected towards a beam splitter cube 31 which passes a first portion of that light towards a flat surface mirror which reflects the light beam incident thereon back towards the beam splitter cube 31. A second portion of the light reflected onto beam splitter cube 31 is reflected thereby towards a corner cube mirror 35 attached to the photodetector 13. Corner cube mirror 35 reflects the light beam incident thereon back towards the beam splitter cube 31 where it recombines with the light reflected off surface mirror 33. The recombined light beam has an interference fringe pattern having a light intensity dependent on the phase relationship of the light beams respectively reflected from mirror 33 and corner cube mirror 35 and therefore dependent on the optical path lengths between the beam splitting cube 31 and the respective mirror 33 and the corner cube mirror 35. Whenever the optical path difference between those two paths differs by an integral number of one-half wavelengths of the light beam of the laser 23, the central pattern of the interference fringe pattern is either bright or dark depending on the phase relationship between the beams reflected back towards cube 31. By monitoring that central pattern through a fringe detector 37, horizontal movements of photodetector 13 occuring at substantially constant velocity travel can be conservatively measured to an accuracy of ⅛ of a wavelength of the light output of laser 23 (e.g., for a laser output wavelength of 4579Å distances as small as 572A can be measured). This monitored central pattern of the interference fringe pattern which is readily and accurately calibrated to submicron values provides a reference against which the time spot intensity profile dimensions are measured.

To facilitate the rapid cross focusing adjustments of the focused laser beam and rough positioning of the focused spot on the knife-edge, a manual positioning system is incorporated in the embodiment of FIG. 1. The manual system comprises light source 39 providing white light which is reflected by a partially silvered mirror 41 towards the focusing lens 21 through the dichroic mirror 29 to illuminate the focused spot and the knife-edge 11. Viewing lenses 43 (illustratively, a microscope eye piece matched to the focusing lens 21 and the white light source focusing lens) enables an operator, through the adjustments of the manual screws of the XYZ translation stage 15, to achieve gross focusing adjustments of the focused laser beam and a rough positioning of the focused spot formed on the knife-edge 11.

Repetitive scanning of the focused spot by the knife-edge is achieved by energizing the horizontal piezoelectric translator 17 with the output of a triangular wave generator 47 (illustratively, of a 3.5Hz frequency and a peak-to-peak value which is sufficient to insure a complete scan of the spot). The output of photodetector 13, representative of the laser light power not occluded during the knife-edge displacement, is applied to one input of oscilloscope so that it may be simultaneously displayed along with the output of fringe detector 37. Oscilloscope 45, which is capable of operation in a delayed time base mode, enables the expansion and examination of that portion of photodetector output 13 which is representative of the knife-edge 11 transition across the spot. The derivative of the output of photodetector 13 during knife-edge 11 transition across the spot developed at the junction of the series connection of a capacitor 49 and a resistor 51 and representative of the measured spot profile is also applied to another input of oscilloscope 45 for simultaneous display with the aforementioned output of fringe detector 37 and output of photodetector 13. Triangular wave generator 47 also provides a synchronization signal to oscilloscope 45.

Where measurement of submicron focused spot sizes is desired, manual focusing is inadequate to provide the necessary focusing accuracy. For example, for a focused spot having a 3,000Å diameter the depth of field is approximately 1,000Å which exceeds the resolution capability of a manual positioning system. In accordance with the illustrated embodiment of the present invention, fine focusing adjustments are accomplished through energization of the vertical piezoelectric translator 19 with the output of high voltage generator 53. By observing the displayed spot profile on the screen of oscilloscope 45 and adjusting the output of high voltage generator 53 so that the displayed spot profile width is the smallest that can be achieved, proper focusing is readily accomplished even for spots of submicron dimensions.

FIG. 2 illustrates the relationship between the various waveforms displayed by oscilloscope 45 in FIG. 1.

Waveform "a" is illustrative of that portion of the output of the fringe detector 37 occuring during intervals corresponding to substantially constant velocity motion of the knife-edge 11. The waveform uniformly varies between a high level and a low level and the distance covered on the display by one full cycle of the waveform is equivalent to one-half the wavelength of the light output of laser 23 (in this embodiment 2289Å). Waveform "b" is illustrative of a portion of the output of photodetector 13 which occurs during the transition of the knife-edge over the focused spot. The derivative of the output of photodetector 13 is illustrated in waveform "c." This waveform "c" is a graph of the spot intensity profile as function of knife-edge displacement. The half intensity diameter of the focused spot is accurately and readily determined by an observer of the simultaneous display of waveforms "a" and "c."

FIG. 3 illustrates one embodiment, in accordance with the principles of the present invention, of a knife-edge which is integrally formed with a photodetector. The knife-edge 11 is advantageously formed of a thin (e.g., approximately 600Å) layer of chrominum which is evaporated directly on one side of a glass plate 55. The knife-edge 11 is photolithographically etched to form a straight abrupt edge. Photodetector 13 is directly affixed to the other side of the glass plate 55 by means of a polymer sealant 57. An immersion liquid 59, such as an immersion oil having a refractive index of 1.518 fills a region defined between the light sensitive surface of photodetector 13 and the glass plate 55.

What is claimed is:

1. Apparatus, for measuring the intensity profile of a cross section of a light beam provided by a light source of known wavelength, comprising:
    a knife-edge;
    means for establishing relative motion between the knife-edge and the light beam in a manner causing repeated transverse scannings by the knife-edge of the light beam;
    means, abutting said knife-edge, for detecting the beam light power not occluded by the knife-edge during said repeated scannings, said detecting means having a light sensitive surface and means, overlying said light sensitive surface, for effecting an alteration in the apparent optical properties of said light sensitive surface such that the apparent optical properties of said light sensitive surface substantially correspond to the optical properties of the light sensitive surface of an information record blank;
    means for differentiating the output of said detecting means;
    interferometer means for measuring said relative motion; and
    means for simultaneously displaying the output of said differentiating means and the output of said measuring means.

2. Apparatus in accordance with claim 1 wherein:
    said knife-edge is fixedly attached to said detecting means.

3. Apparatus in accordance with claim 2 wherein said means for effecting an alteration in the optical properties of said light sensitive surface comprises:
    a transparent plate;
    a fluid tight chamber interposed between the light sensitive surface and the transparent plate;
    a fluid disposed in said chamber; and
    wherein said knife-edge comprises:
    a thin opaque layer formed on one surface of said transparent plate and etched to form a smooth edge.

4. Apparatus in accordance with claim 1 further comprising:
    means for enabling visual observation of the relative positions of said knife-edge and said beam; and
    manual means for establishing relative motion between said knife-edge and said beam in a manner causing rough coplanar alignment of said knife-edge with said cross-section in response to said visual observation.

* * * * *